Patented Apr. 14, 1953

2,635,124

UNITED STATES PATENT OFFICE 2,635,124

VULCANIZATION OF RUBBER

Byron A. Hunter, Oxford, and Harry D. Glenn, Naugatuck, Conn., assignors to United States Rubber Company, New York, N. Y., a corporation of New Jersey No Drawing. Application March 22, 1951, Serial No. 217,066

8 Claims. (Cl. 260—787)

This invention relates to the vulcanization of rubber and similar sulfur-vulcanizable rubber-like materials by an improved process employing a new accelerator mix. In particular, the invention relates to the use of chemicals suitable as activators of thiazole accelerators which are also known as thiazyl sulfide accelerators.

Thiazyl sulfide accelerators are widely used in the vulcanization of rubber, the two most outstanding examples being mercaptobenzothiazole and dibenzothiazyl disulfide. In actual practice the thiazyl sulfide accelerator is used with a chemical activator which increases the rate of cure. The improvement of this invention is concerned with the use of certain substituted ammonium carbamates as activators for the primary accelerator.

The substituted ammonium carbamates are effective activators of thiazyl sulfide accelerators and may be employed in the vulcanization of either natural or synthetic rubber which is vulcanizable with sulfur, and therefore those synthetic rubbers which are vulcanizable by sulfur are to be considered the equivalent of natural rubber for the purposes of the invention. The new activators subscribe to the formula

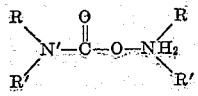

where R is an alkyl, cycloalkyl, beta-cyanoalkyl, aralkyl, or alkylene group; R' being hydrogen, alkyl, aralkyl, or alkylene group.

Exemplary of such chemical activators are:

N,N-dimethyl ammonium N',N'-dimethyl carbamate
N-ethyl ammonium N'-ethyl carbamate
N,N-diethyl ammonium N',N'-diethyl carbamate
N-propyl ammonium N'-propyl carbamate
N-isopropyl ammonium N'-isopropyl carbamate
N,N-dipropyl ammonium N',N'-dipropyl carbamate
N,N-diisopropyl ammonium N',N'-diisopropyl carbamate
N-butyl ammonium N'-butyl carbamate
N,N-dibutyl ammonium N',N'-dibutyl carbamate
N-amyl ammonium N'-amyl carbamate
N-hexyl ammonium N'-hexyl carbamate
N-octyl ammonium N'-octyl carbamate
N-nonyl ammonium N'-nonyl carbamate
N-dodecyl ammonium N'-dodecyl carbamate
N-octadecyl ammonium N'-octadecyl carbamate
N-benzyl ammonium N'-benzyl carbamate
N-cyclohexylammonium N'-cyclohexyl carbamate
N-ethyl-N-cyclohexylammonium N'-ethyl-N'-cyclohexyl carbamate
Morpholinium N'-oxydiethylene carbamate
Piperidinium N'-cyclopentamethylene carbamate
N-ethyl beta-cyanoethylammonium N'-ethyl N'-beta-cyanoethyl carbamate
N,N-dimethylammonium N'-benzyl carbamate
N,N-diethyl ammonium N'-benzyl carbamate
N,N-dimethylammonium N'-n-butyl carbamate.

Examples of thiazyl sulfide accelerators, amongst others, which are useful as primary accelerators for purposes of the invention, include:

Mercaptobenzothiazole
Zinc salt of mercaptobenzothiazole
Dibenzothiazyl disulfide
N-cyclohexyl benzothiazyl sulfenamide
2-mercapto-4-ethyl thiazole
Bis (4,5-dimethyl thiazyl sulfide
Dinitrophenyl benzothiazyl sulfide
Phenyl amino methyl 2-benzothiazyl sulfide.

Accordingly, the invention embraces a sulfur-vulcanizable rubber composition containing, beside sulfur, a primary thiazyl sulfide accelerator and an activator therefor, which is a substituted ammonium carbamate; more particularly, a carbamate selected from the class consisting of dialkylammonium dialkyl carbamates, monoalkylammonium monoalkyl carbamates, monoaralkyl ammonium monoaralkyl carbamates, cycloalkylammonium cycloalkyl carbamates, alkyl cycloalkylammonium alkyl cycloalkyl carbamates, dialkylammonium monoaralkyl carbamates, alkyl beta-cyanoethylammonium alkyl beta-cyanoethyl carbamates, dialkylammonium monoalkyl carbamates, morpholinium oxydiethylene carbamates, piperidinium cyclopentamethylene carbamates.

The cyclohexylamine derivative shown above has a practical advantage over the carbamates from methyl, ethyl, dimethyl, diethyl, isopropyl and butyl amines, in that it is less hygroscopic, less easily sublimed, and has less odor. It is also exceptionally strong as an activator. The octyl, dodecyl and octadecyl carbamates are also exceptionally strong activators of desirable physical properties, but presently are more expensive.

The substituted ammonium carbamates are readily prepared by reaction of dry carbon dioxide on the anhydrous amines. A non-aqueous solvent may be used or the reaction may be conducted in liquid or vapor phase without a solvent. The preferred method is to add solid carbon dioxide to the amine in a solvent other than water (e. g., benzene, petroleum ether, chlorinated solvents, ethyl alcohol). Sufficient solid carbon dioxide is added to convert all of the amine to the carbamate. Generally, an excess of solid carbon dioxide is used since the unreacted carbon dioxide rapidly volatilizes away. The end of the reaction is reached when the initial exothermic reaction ceases and the solution becomes cold. The products generally separate as crystalline solids or as oils which may crystallize on standing.

Some of the substituted ammonium carbamates which appear to be new are:

Cyclohexylammonium N'-cyclohexyl carbamate, M. P. 112–113° C. Anal. % N: Calc., 11.6%. Found, 11.35%.

Isopropylammonium N'-isopropyl carbamate, M. P. 80–81° C. (sealed tube). Anal. % N: Calc., 17.3%. Found, 16.9%.

Morpholinium N'-oxydiethylene carbamate, M. P. 99–101° C. (w/gas evolution). Anal. % N: Calc., 12.82%. Found, 12.68%, 12.63%.

Octylammonium N'-octyl carbamate, M. P. 84–86° C. Anal. % N: Calc., 9.26%. Found, 9.08, 9.07%.

Heptylammonium N'-heptyl carbamate, M. P. 82–84° C. Anal. % N: Calc., 10.22%. Found, 9.86, 9.96, 10.12%.

n-Propylammonium N'-n-propyl carbamate, M. P. 73–74° C. Anal. % N: Calc., 17.3%. Found, 16.6%.

n-Butylammonium N'-n-butyl carbamate, M. P. 81–82° C. Anal. % N: Calc., 14.7%. Found, 14.53%.

The following examples are given to illustrate the invention, the parts being by weight:

| | |
|---|---|
| Natural rubber (smoked sheets) | 100.0 |
| Carbon black | 45.0 |
| Zinc oxide | 5.0 |
| Pine tar | 3.5 |
| Zinc salts of cocoanut oil fatty acids | 3.5 |
| Surfur | 3.0 |
| Diphenylamine-acetone reaction product (antioxidant) | 1.0 |
| Mercaptobenzothiazole | 0.5 |
| | 161.5 |

This natural rubber composition was divided into portions and these mixed with chemicals of this invention in the amounts shown in the table and the resulting stocks cured for 30 minutes at 30 pounds per square inch steam pressure. The stress at 300% and 500% elongation as well as the ultimate tensile (p. s. i.) strength and ultimate elongation were measured. The results are compiled in the table.

TABLE I

| Stock | Activator | Amount | Stress | | | Elongation at break |
|---|---|---|---|---|---|---|
| | | | 300% | 500% | Break | |
| A | None | | 630 | 1770 | 2710 | 630 |
| B | Cyclohexylammonium cyclohexyl carbamate. | (0.3) | 1590 | 3820 | 4230 | 556 |
| C | Dodecylammonium dodecyl carbamate. | (0.3) | 1330 | 3100 | 4010 | 625 |
| D | Benzylammonium benzyl carbamate. | (0.3) | 1230 | 3030 | 3990 | 630 |
| E | Isopropylammonium isopropylcarbamate. | (0.3) | 1280 | 2790 | 4050 | 660 |
| F | Heptylammonium heptyl carbamate. | (0.25) | 1073 | 2680 | 3980 | 690 |
| G | Octylammonium octyl carbamate. | (0.25) | 1125 | 2840 | 4130 | 675 |
| H | Piperidinium cyclopentamethylene carbamate. | (0.25) | 800 | 2190 | 3510 | 686 |
| I | Morpholinium oxydiethylene carbamate. | (0.25) | 890 | 2350 | 3675 | 686 |
| J | Diphenylguanidine | (0.3) | 1180 | 2930 | 3830 | 586 |
| K | Mercaptobenzothiazole. | (0.5) | 900 | 2480 | 3640 | 650 |

By variation in the quantity of activators used, greater or less activation may be obtained to suit the particular need. In general, 0.1 to 1.0 part of the activator based on 100 parts of the rubber of the thiazole-accelerated stock should be used. The primary accelerator may be used in usual amounts, but is preferably reduced on the order of 0.1 to 1.0 part to 100 parts of rubber.

Instead of being added separately, the accelerator-activator mixed can be previously prepared and composed of a major proportion of the thiazole accelerator and a minor proportion of the activator, and added in the form of a mixture to the vulcanizable rubber batch.

The invention may be practiced with the use of fillers, softeners, and antioxidants other than those shown in the above examples, and the rubber when compounded for curing may be either in solid form, or in the form of an emulsion or dispersion.

Having thus described our invention, what we claim and desire to protect by Letters Patent is:

1. A natural rubber composition containing sulfur sufficient to cure the rubber, a primary thiazyl sulfide accelerator, and an activator for said accelerator which is a carbamate of the formula

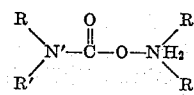

where R is a member selected from the class consisting of an alkyl, cycloalkyl, beta-cyanoalkyl, aralkyl, and alkylene group; R' being a member selected from the class consisting of hydrogen, alkyl, aralkyl, and alkylene, said activator being present in an amount sufficient to activate the primary accelerator.

2. A method which comprises vulcanizing a composition containing natural rubber, sulfur sufficient to cure the rubber, a primary thiazyl sulfide accelerator, and an activator of the formula

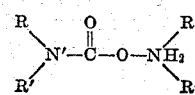

where R is a member selected from the class consisting of an alkyl, cycloalkyl, beta-cyanoalkyl, aralkyl, and alkylene group; R' being a member selected from the class consisting of hydrogen, alkyl, aralkyl, and alkylene said activator being present in an amount sufficient to activate the primary accelerator.

3. Cyclohexylammonium cyclohexyl carbamate.

4. Octyl ammonium octyl carbamate.

5. A vulcanization accelerator composition which is a mixture of a major proportion of thiazyl sulfide accelerator and a minor proportion of an activator for said accelerator which is a carbamate of the formula

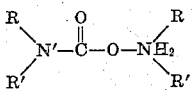

where R is an alkyl, cycloalkyl, beta-cyanoalkyl, aralkyl, or alkylene group; R' being hydrogen, alkyl, aralkyl, or alkylene group.

6. A vulcanization activator which is a carbamate selected from the group consisting of cyclohexyl-ammonium cyclohexyl carbamate, and octyl ammonium octyl carbamate.

7. A method which comprises vulcanizing a natural rubber composition containing sulfur sufficient to cure the rubber, a primary thiazyl sulfide accelerator, and from about 0.1 to 1.0 part by weight (based on 100 parts by weight of the rubber) of an activator for said primary accelerator which is a carbamate of the formula

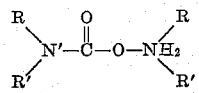

wherein R is a member selected from the class consisting of an alkyl, cycloalkyl, beta-cyanoalkyl, aralkyl, and alkylene group; R' being a member selected from the class consisting of hydrogen, alkyl, aralkyl, and alkylene.

8. A natural rubber composition containing sulfur sufficient to cure the rubber, a primary thiazyl sulfide accelerator, and from about 0.1 to 1.0 part by weight (based on 100 parts by weight of the rubber) of an activator for said primary accelerator which is a carbamate of the formula

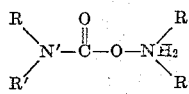

where R is a member selected from the class consisting of an alkyl, cycloalkyl, beta-cyanoalkyl, aralkyl, and alkylene group; R' being a member selected from the class consisting of hydrogen, alkyl, aralkyl, and alkylene.

BYRON A. HUNTER.
HARRY D. GLENN.

References Cited in the file of this patent

UNITED STATES PATENTS

| Number | Name | Date |
|---|---|---|
| 1,926,739 | Clapson et al. | Sept. 12, 1933 |
| 2,222,354 | Lichty | Nov. 19, 1940 |

OTHER REFERENCES

Skita et al., Ber. Deut. Chem., vol 53, pages 1242–55 (1920). (Copy in Sci. Lib.)

Flaschentrager et al., Z. Physiol. Chem., vol. 192, pages 268–273 (1930). (Copy in Sci. Library.)